United States Patent
Stewart et al.

(10) Patent No.: US 12,399,997 B2
(45) Date of Patent: Aug. 26, 2025

(54) AUTHENTICATION OF HARDWARE COMPONENT FIRMWARE

(71) Applicant: HEWLETT-PACKARD DEVELOPMENT COMPANY, L.P., Spring, TX (US)

(72) Inventors: Christopher H Stewart, Spring, TX (US); Baraneedharan Anbazhagan, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/923,390

(22) PCT Filed: Jun. 24, 2020

(86) PCT No.: PCT/US2020/039371
§ 371 (c)(1),
(2) Date: Nov. 4, 2022

(87) PCT Pub. No.: WO2021/262161
PCT Pub. Date: Dec. 30, 2021

(65) Prior Publication Data
US 2025/0077675 A1  Mar. 6, 2025

(51) Int. Cl.
G06F 21/00 (2013.01)
G06F 21/57 (2013.01)
G06F 21/64 (2013.01)

(52) U.S. Cl.
CPC ............ G06F 21/572 (2013.01); G06F 21/64 (2013.01)

(58) Field of Classification Search
CPC ............... G06F 21/64; G06F 21/572
USPC .............................................. 726/26
See application file for complete search history.

(56) References Cited

U.S. PATENT DOCUMENTS

| | | | |
|---|---|---|---|
| 8,898,654 B2 | 11/2014 | Young et al. | |
| 9,747,094 B2 | 8/2017 | Shroni et al. | |
| 2005/0021968 A1 | 1/2005 | Zimmer et al. | |
| 2006/0143600 A1 | 6/2006 | Cottrell et al. | |
| 2009/0327741 A1 | 12/2009 | Zimmer et al. | |
| 2013/0013905 A1 | 1/2013 | Held et al. | |
| 2014/0068594 A1 | 3/2014 | Young et al. | |
| 2015/0089209 A1 | 3/2015 | Jacobs et al. | |
| 2018/0089435 A1* | 3/2018 | Zander .................. | G06F 21/577 |

(Continued)

FOREIGN PATENT DOCUMENTS

EP  2141625 B1  10/2015

OTHER PUBLICATIONS

Cooper, D., et al., "BIOS Protection Guidelines", Recommendations of the National Institute of Standards and Technology, Apr. 2011, NIST Special Publication 800-147, 26 pages

*Primary Examiner* — Josnel Jeudy
(74) *Attorney, Agent, or Firm* — Quarles & Brady LLP

(57) ABSTRACT

An example apparatus may include a hardware component, a memory, and a processor. The processor may retrieve a firmware for the hardware component subsequent to the firmware being loaded on the hardware component. The processor may determine that a firmware signature associated with the firmware is stored in the memory. In some examples, in response to a determination that the firmware signature associated with the firmware is stored in the memory, the processor may initiate authentication of the firmware.

11 Claims, 4 Drawing Sheets

(56) References Cited

U.S. PATENT DOCUMENTS

| | | | |
|---|---|---|---|
| 2019/0042229 A1* | 2/2019 | Kotary | G06F 8/65 |
| 2020/0257518 A1* | 8/2020 | Liedtke | G06F 8/65 |
| 2021/0216638 A1* | 7/2021 | Park | G06F 21/572 |
| 2022/0179960 A1* | 6/2022 | Spangler | H04L 9/3239 |

* cited by examiner

AUTHENTICATION OF HARDWARE COMPONENT FIRMWARE

BACKGROUND

Electronic devices, including computing devices, may be made up of many different hardware components. These hardware components may include firmware to support various features on the electronic devices, and in some cases may support firmware updates.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
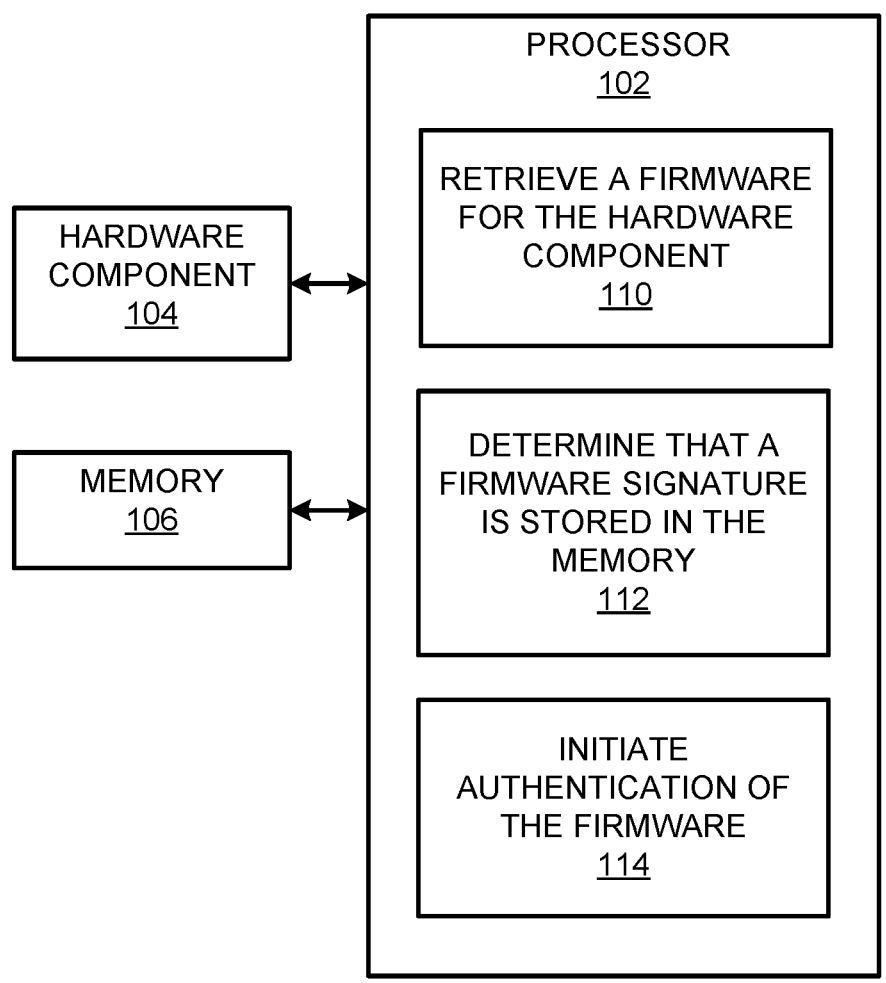
FIG. 1 depicts a block diagram of an example apparatus that may initiate authentication of firmware for a hardware component.

Disclosed herein are apparatuses, systems, methods, and computer-readable media that may initiate authentication of a hardware component firmware (hereinafter simply referred to as firmware). Electronic devices, such as personal computers, may be made up of many different hardware components, including cameras, a mouse or mouse-like glide and click pads, hardware interfaces/connectors, or the like. Many of these hardware components may have firmware and may support firmware updates that may correct bugs, add features, address security issues, change hardware component behavior, and/or the like.

As used herein, a firmware (or a device firmware) refers to instructions to provide low-level control for a hardware component's specific hardware. The firmware may provide a standardized operating environment for more complex device software (e.g., an operating system of a computing device), or may operate as an operating system for the hardware component, performing control, monitoring, data manipulation functions, and/or the like. The firmware may be stored in a non-volatile memory of the hardware component such as read-only memory (ROM), flash memory, and/or the like.

In some examples, a firmware for a hardware component may be authenticated and/or recovered to an authenticated version of the firmware, for instance, in cases where a firmware update mechanism is not supported by the firmware, where a hardware component supports a firmware update mechanism(s) that does not support authentication, or the like. In this regard, a processor may authenticate the firmware in cases where that firmware may have been loaded (e.g., installed or updated) in a less secure context, for instance, in an OS context that may be more vulnerable to attacks. In some examples, a Basic Input/Output System (BIOS) may be implemented to allow or deny initialization, control, and operation of the hardware component based on a signature verification of the firmware.

As used herein, a BIOS refers to hardware or hardware and instructions to initialize, control, or operate a computing device prior to execution of an OS. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or bootup the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

During bootup, the BIOS may first perform various pre-OS operations including, for instance, a Power-On Self-Test (POST), and may then proceed to load the OS. During the bootup process, the BIOS or an embedded controller (EC) may retrieve a firmware for a hardware component connected to an electronic device, such as a computer. The BIOS or the embedded controller may determine whether a firmware signature associated with the retrieved firmware is stored in a memory, for instance, in a private Serial Peripheral Interface (SPI) of the embedded controller. In response to a determination that the firmware signature associated with the retrieved firmware is stored in the memory, the BIOS or the embedded controller may initiate authentication of the firmware.

In some examples, the BIOS (or the embedded controller) may determine that the firmware is inauthentic in response to the firmware signature associated with the firmware being absent from the memory of the embedded controller. In this instance, the BIOS may initiate a recovery process to recover the firmware for the hardware component. In some examples, based on a determination that a firmware update for the hardware component is stored in the memory, the processor may execute the BIOS to replace the firmware with the firmware update at the hardware component and authorize the hardware component to establish connection to a bus based on the firmware update. In some examples, the BIOS may disable the hardware component or prevent connection of the hardware component, for instance to a bus (e.g., a PCI bus, USB bus, or the like), and/or may generate a notification recommending recovery of the firmware when authentication fails.

A concern associated with some hardware components may be that a firmware update mechanism(s) supported by the hardware components may not support any mechanism for authenticating the firmware updates or may support both an authentication mechanism and insecure updates (e.g., legacy update mechanisms that do not support authentication), and in such instances, some hardware component firmware updates may be insecure. By enabling, for instance, a BIOS/EC to authenticate a device firmware, the BIOS/EC may be implemented to disallow a device firmware loaded using unsupported firmware update mechanisms. In this regard, the BIOS/EC may invalidate insecure updates, for instance, via recovery, device disablement, notifications, and/or the like, and thereby provide a mechanism to recover to a firmware that has been authenticated. The apparatuses, systems, methods, and computer-readable media discussed herein may improve security for hardware components on legacy firmware update mechanisms or unsupported firmware update mechanisms, for instance, when the hardware component itself supports no authentication mechanism or when the hardware component presents a firmware update mechanism in a less secure context.

By allowing the BIOS/EC to authenticate the device firmware at bootup, security of the system, including security for legacy devices that may not support a mechanism for firmware updates, may be improved by automatically disabling a hardware component once an attack is discovered, or in some cases, automatically recovering the firmware to an authenticated firmware version. As such, firmware recovery and update may be implemented in a relatively quick and efficient manner, which may enable a computing device on which the BIOS/EC is executed to operate in an efficient and secure manner.

Reference is first made to FIG. 1, which shows a block diagram of an example apparatus 100 that may initiate authentication of firmware. It should be understood that the apparatus 100 depicted in FIG. 1 may include additional features and that some of the features described herein may be removed and/or modified without departing from the scope of the apparatus 100.

The apparatus 100 may include a processor 102, a hardware component 104, and a memory 106. The apparatus 100 may be a server, a node in a network (such as a data center), a personal computer, a laptop computer, a tablet computer, a smartphone, a network gateway, a network router, an electronic device such as Internet of Things (IoT) device, and/or the like. The processor 102 may be a semiconductor-based microprocessor, a central processing unit (CPU), an application-specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single memory 106 may be understood to additionally or alternatively pertain to multiple processors 102 and multiple memories 106.

The hardware component 104 may be, for example, a device loaded on the apparatus 100 and may include a camera, a keyboard, a computer mouse, a mouse-like glide and click pad, a data connector, a disk drive, a video controller, or the like. In some examples, the hardware component 104 may be integrated in a single housing with the processor 102 and memory 106, or in some examples, the hardware component 104 may be connected externally to the housing, for instance, using an expansion port, or the like.

The hardware component 104 may include firmware loaded onto the hardware component 104. The firmware may enable various features and functions on the hardware component 104. In this regard, the firmware may generally be defined as a set of instructions that may provide low-level control for the hardware component in and/or attached to the apparatus 100. In some instances, the firmware may provide a standardized operating environment for more complicated software, such as an operating system, in the apparatus 100. In some examples, the hardware component 104 may support firmware updates that may correct device bugs, add device features, fix security problems, enable various changes to device behaviors, or the like.

The memory 106 may be, for example, a non-volatile memory such as, Read-Only Memory (ROM), flash memory, solid state drive, Random-Access memory (RAM), an Electrically Erasable Programmable Read-Only Memory (EEPROM), a storage device, an optical disc, or the like. By way of example, the memory 106 may be non-volatile random-access memory (NVRAM), which may be implemented to store and return data over a serial programmable interface (SPI) bus/connection. The memory 106 may be implemented on an embedded controller, for instance, in the form of an SPI chip. In some examples, the memory 106 may store information to authenticate and support update of the firmware for the hardware component 104. For instance, the memory 106 may store a firmware signature associated with the firmware.

As shown in FIG. 1, the processor 102 may perform various operations 110-114 to initiate authentication of firmware of the hardware component 104. The operations 110-114 may be hardware logic blocks that the processor 102 may execute. In other examples, the operations 110-114 may be computer-readable instructions, e.g., non-transitory computer-readable instructions. In other examples, the apparatus 100 may include a combination of instructions and hardware logic blocks to implement or execute functions corresponding to the operations 110-114.

The processor 102 may execute the operation 110 to retrieve a firmware for the hardware component 104 subsequent to the firmware being loaded on the hardware component 104. In this regard, the firmware may be installed during manufacture, updated using update mechanisms including unsupported or insecure update mechanisms (e.g., update mechanisms that do not support authentication of the firmware), or the like, to load an image of the firmware on the hardware component 104.

The processor 102 may execute the operation 112 to determine that a firmware signature associated with the firmware is stored in the memory 106. In some examples, the memory 106 may be a memory accessible during bootup. In response to a determination that the firmware signature associated with the firmware is stored in the memory 106, the processor 102 may execute the operation 114 to initiate authentication of the firmware. In this regard, the processor 102 may verify the firmware with the firmware signature. In response to verification of the firmware, the processor 102 may allow or disallow the hardware component 104 to start up and/or to connect to a bus of the computing device, such as a PCI bus, USB bus, or the like. In some examples, the processor 102 may determine that the firmware is not authentic in response to a determination that the firmware signature associated with the firmware is not stored in the memory 106. In this regard, based on a determination that a firmware signature is not stored in the memory 106, the processor 102 may disallow the hardware component to start up, shut down the hardware component, recover to a firmware that has been authenticated, generate a notification to an end user or to a system administrator via the OS, and/or the like.

Figure 2:
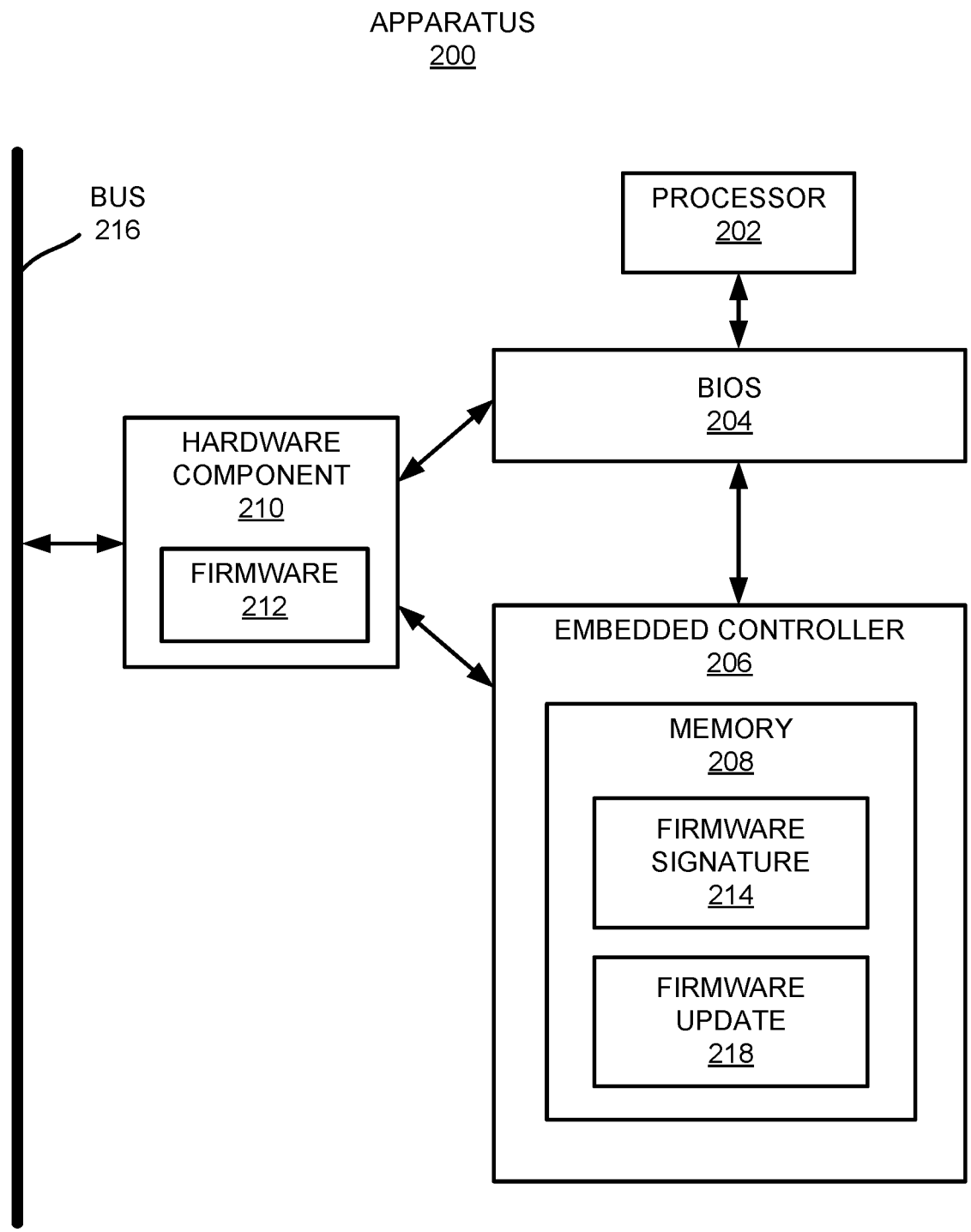
FIG. 2 shows a block diagram of an example apparatus that may initiate a recovery process to recover firmware for a hardware component.

Reference is now made to FIG. 2, which shows a block diagram of an example apparatus 200 that may initiate a recovery process to recover firmware 212 for a hardware component 210. It should be understood that the apparatus 200 depicted in FIG. 2 may include additional features and that some of the features described herein may be removed and/or modified without departing from the scope of the apparatus 200.

The apparatus 200 may include a processor 202, a BIOS 204, an embedded controller 206 having a memory 208, and a hardware component 210. The processor 202 may be equivalent to the processor 102, the memory 208 may be equivalent to the memory 106, and the hardware component 210 may be equivalent to the hardware component 104 depicted in FIG. 1 and may thus respectively include the components described in FIG. 1 with respect to the processor 102, memory 106, and the hardware component 104.

According to examples, the processor 202 may execute the BIOS 204 to initialize, control, and/or operate the apparatus 200 and the hardware component 210. During apparatus 200 bootup, the processor 202 may cause the BIOS 204 to first perform a Power-On Self-Test (POST) and may then proceed to load the OS. In some examples, the processor 202 may cause the BIOS 204 to authenticate the firmware 212 during POST. In some examples, the processor 202 may cause the BIOS 204 to initiate authentication of the firmware 212 at every bootup, periodically (e.g., at every cold bootup), on-demand, or the like.

The processor 202 may execute the BIOS 204 to retrieve the firmware 212 from the hardware component 210 during bootup. The firmware 212 may have been previously loaded onto the hardware component 210, for instance, during manufacture or during a previous firmware update process.

The processor 202 may determine whether a firmware signature 214 associated with the firmware 212 is stored in the memory 208. In some examples, the firmware signature 214 may be stored on the memory 208 through a trusted firmware update mechanism. As such, in examples in which unsupported or insecure firmware update mechanisms are used to update the firmware 212, the firmware signature 214 that corresponds to the firmware 212 may be absent from the memory 208. In this regard, the processor 202 may detect insecure firmware updates during a subsequent bootup, based on an absence of the corresponding firmware signature 214.

In response to a determination that the firmware 212 is inauthentic, the processor 202 may initiate a recovery process to recover the firmware 212 for the hardware component 210. In some examples, the recovery process may include the processor 202 causing the BIOS 204 to disable and/or disconnect the hardware component 210, automatically updating the firmware 212 to a trusted version, or generating a notification indicating a status of the firmware authentication. As such, an attack initiated through, for instance, an unsupported firmware update mechanism cannot be persisted as the processor 202 may disable or disconnect the hardware component 210 upon detection of the attack, restore the firmware 212 to a firmware version, and/or generate a notification indicating a status of the firmware to the end user and/or a system administrator via an BIOS/EC-to-OS alerting interface (e.g., a firmware audit log).

In response to a determination that the firmware signature 214 associated with the firmware 212 is stored in the memory 208, the processor 202 may initiate authentication of the firmware 212. In this regard, the processor 202 may retrieve the firmware signature 214 from the memory 208 of the embedded controller 206 to the BIOS 204 to authenticate the firmware 212.

In some examples, the processor 202 may cause the BIOS 204 to determine that the firmware is authentic or inauthentic based on a verification process to authenticate the firmware 212 using the firmware signature 214. In this regard, the verification process may include use of hash functions, a private key-pair, or the like, for authentication of the firmware 212. Once the authenticity of the firmware 212 has been verified, the processor 202 may execute the BIOS 204 to allow the hardware component 210 to startup during bootup of the apparatus 100. In some examples, the BIOS 204 may allow the hardware component 210 to connect to a bus 216 of the computing device.

In some examples, the processor 202 may determine that the firmware 212 is not authentic in response to a determination that the firmware signature 214 associated with the firmware 212 is not stored in the memory 208. In this regard, an absence of the firmware signature 214 may be an indication that the firmware 212 is not secure/trusted.

In response to a determination that the firmware 212 is inauthentic, the processor 202 may cause the BIOS 204 to initiate a recovery process to recover the firmware 212 for the hardware component 210. In some examples, to initiate the recovery process, the processor 202 may cause the BIOS 204 to disallow connection of the hardware component 210 to the bus 216, disable the hardware component 210, replace the firmware 212 for the hardware component 210, and/or generate a notification indicating an authentication status of the firmware 212 of the hardware component 210.

In this regard, the BIOS 204 may perform various combinations of operations to disable a hardware component 210 associated with an unauthorized firmware 212. For instance, the BIOS 204 may shut down the hardware component 210 when the firmware 212 cannot be verified using the firmware signature 214 or prevent the hardware component 210 from starting up. In some instances, the BIOS 204 may allow the hardware component 210 to startup, but may prevent the hardware component 210 from connecting to the bus 216. In some instances in which a firmware update 218 associated with the firmware 212 is available in the memory 208, the processor 202 may replace the firmware 212 with the firmware update 218. Alternatively or additionally, the BIOS 204 may allow the unauthorized firmware 212 to operate normally, while generating a notification to the user to indicate the unauthenticated status of the firmware 212.

In some examples, the processor 202 may generate the notification to include an indication that the firmware 212 is not verified or is inauthentic, recommend updating the firmware 212 to a trusted version, or the like. In some examples, the processor 202 may report that the hardware component 210 is not operational to the OS of the apparatus 200 or in a firmware audit log, for instance, to allow users to verify the situation and take appropriate action, such as, loading an authenticated firmware on the hardware component 210. In this regard, installation of an authenticated firmware may include storing a corresponding firmware signature 214 in the memory 208, and as such, authenticity of the firmware 212 may be verified during a subsequent bootup.

In some examples, in response to a determination that the firmware 212 is not authentic, the processor 202 may initiate a firmware replacement process to automatically replace the firmware 212. In this regard, the memory 208 may store a firmware update 218 associated with the firmware 212. The processor 202 may execute the BIOS 204 to retrieve the firmware update 218 from the memory 208 of the embedded controller 206, and may replace the firmware 212 with a firmware, such as the firmware update 218. As such, the BIOS 204 may automatically recover to an authenticated version of the firmware 212 using the firmware update 218 if a firmware verification should ever fail.

While the processor 202 has been described herein as causing the BIOS 204 to initiate authentication of the firmware 212 and initiate a recovery process to recover the firmware 212, in some examples, the processor 202 may cause the embedded controller 206 to perform these operations. For instance, the processor 202 may cause the embedded controller 206 to retrieve the firmware 212 from the hardware component 210, determine that the firmware signature 214 is stored in the memory 208, initiate authentication of the firmware 212 using the firmware signature 214, and/or initiate a recovery process to recover the firmware 212 using the firmware update 218. The embedded controller 206 may recover the firmware 212 by, for instance, automatically replacing the firmware 212 with a version of the firmware 212 that is secure/trusted (e.g., has been authenticated using a firmware signature), generating notifications indicating an authentication status of the firmware 212, or the like. In some examples, the BIOS 204 may store the firmware signature 214 and/or the firmware update 218 in a memory of the BIOS 204, for instance, in an NVRAM, which may be implemented to store and return data over an SPI bus/connection. In some instances, the BIOS 204 may store the firmware signature 214 using a UEFI specification.

Figure 3:
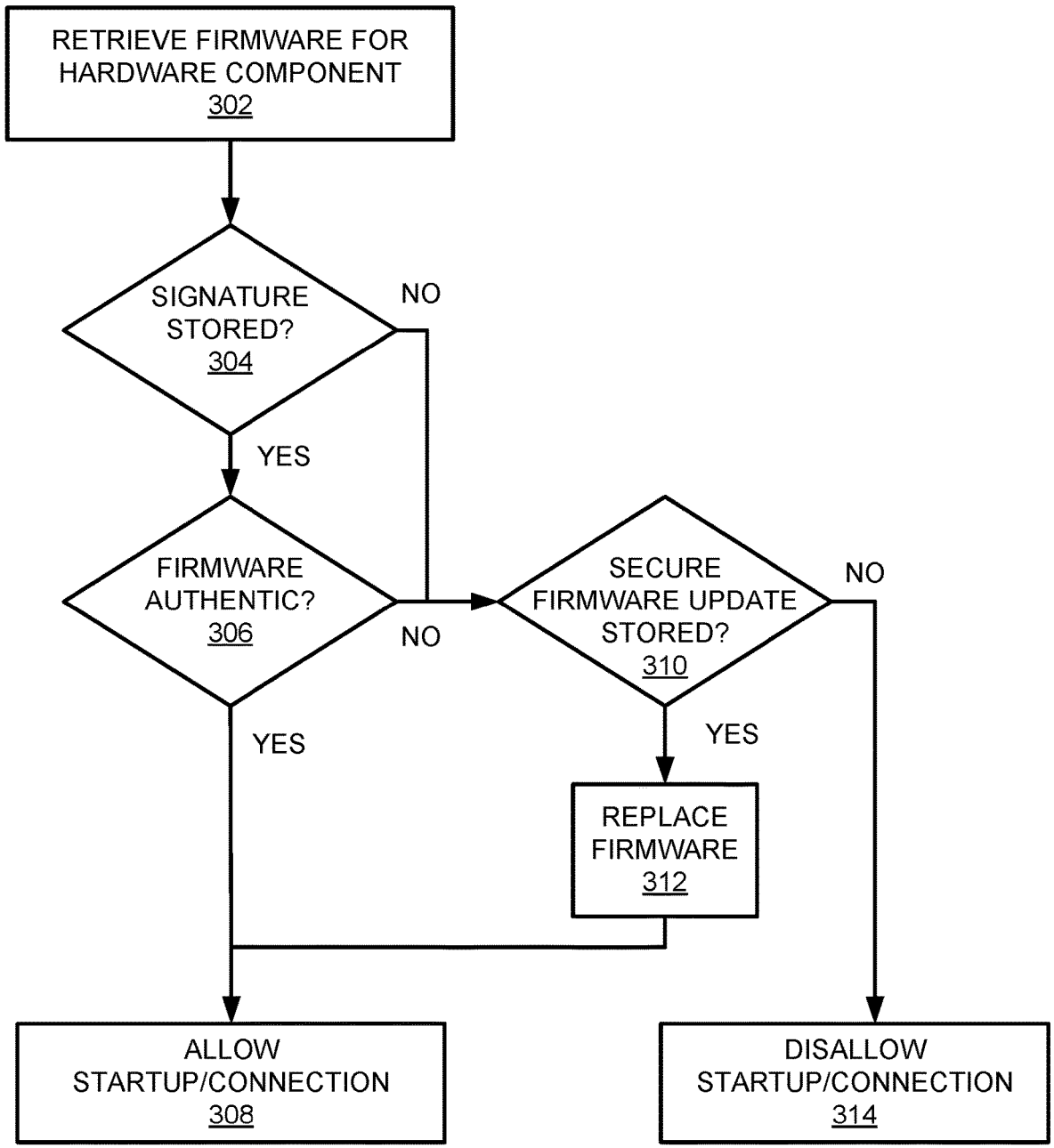
FIG. 3 shows a flow diagram of an example method for authenticating firmware and allowing/disallowing startup/connection of a hardware component.

Various manners in which the processor 102, 202 may operate are discussed in greater detail with respect to the method 300 depicted in FIG. 3. FIG. 3 depicts a flow diagram of an example method 300 for authenticating firmware 212 and allowing/disallowing startup/connection of a hardware component 104, 210. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 102, 202 may retrieve firmware 212 for a hardware component 104, 210. In some examples, the firmware 212 may be stored on the hardware component 210 as a firmware image. At block 304, the processor 102, 202 may determine that a firmware signature 214 associated with the firmware 212 is stored in the memory 208 of an embedded controller 206. In some examples, the firmware signature 214 may be stored in a memory of the BIOS 204, such as an NVRAM.

In response to a determination that the firmware signature 214 is stored in the memory 208, at block 306, the processor 202 may initiate authentication of the firmware 212. In some examples, the processor 202 may execute the BIOS 204 to perform an authentication operation to verify the firmware 212 using the firmware signature 214. At block 308, based on a determination at block 306 that the firmware 212 is authentic, the processor 202 may execute the BIOS 204 to allow the hardware component 210 to startup and/or connect to the bus 216.

The processor 202 may determine that the firmware 212 is inauthentic in response to a determination that the firmware signature 214 associated with the firmware 212 is absent, at block 304, or based on a verification process to authenticate the firmware 212 using the firmware signature 214, at block 306. In response to a determination that the firmware signature 214 is absent at block 304 or that the firmware 212 is unauthentic at block 306, at block 310, the processor 202 may determine whether a firmware update 218 associated with the hardware component 210 is stored in the memory 208 of the embedded controller 206. In response to a determination at block 310 that the firmware update 218 associated with the firmware 212 is stored in the memory 208 of the embedded controller 206, at block 312, the processor 202 may cause the BIOS 204 to automatically replace the firmware 212 with the firmware update 218. In addition, following replacement of the firmware 212 with the firmware update 218, at block 308, the processor 202 may execute the BIOS 204 to allow the hardware component 210 to startup and/or connect to the bus 216.

However, in response to a determination at block 310 that the firmware update 218 associated with the firmware 212 is not stored in the memory 208 of the embedded controller 206, at block 314, the processor 202 may cause the BIOS 204 to disallow startup and/or connection of the hardware component 210. In this regard, the BIOS 204 may block the startup of the hardware component 210 or shut down the hardware component 210. In some examples, the processor 202 may cause the BIOS 204 to prevent connection of the hardware component 210 to the bus 216. Alternatively or additionally, the processor 202 may generate a notification regarding the authentication status of the firmware 212. Such notifications may allow an end user or a system administrator to perform a firmware update using an update mechanism that supports authentication of the firmware 212.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
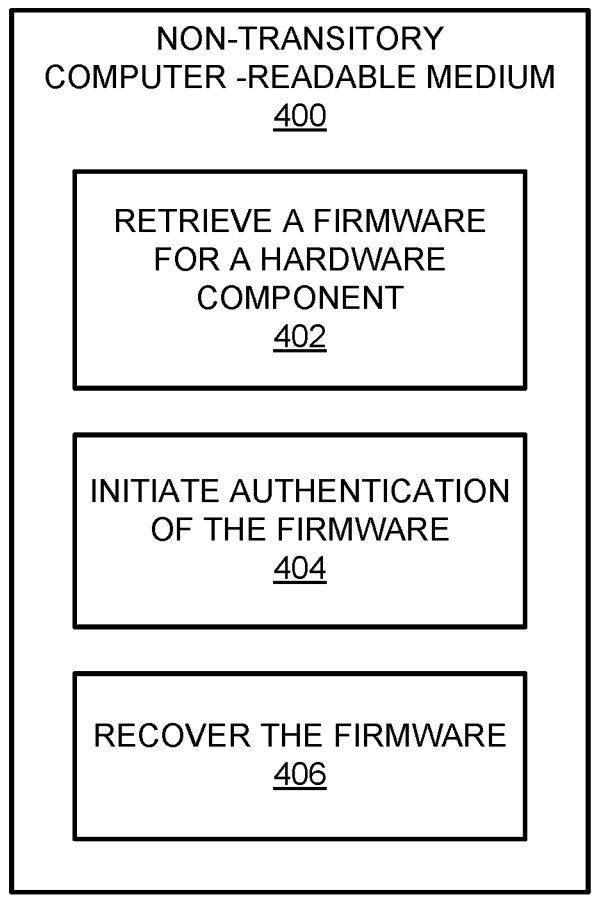
FIG. 4 depicts a block diagram of an example non-transitory computer-readable medium that may have stored thereon computer-readable instructions to initiate authentication of firmware for a hardware component.

Turning now to FIG. 4, there is shown a block diagram of a non-transitory computer-readable medium 400 that may have stored thereon computer-readable instructions to initiate authentication of firmware for a hardware component. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium. The term "non-transitory" does not encompass transitory propagating signals.

The computer-readable medium 400 may have stored thereon computer-readable instructions 402-406 that a processor, such as the processor 102, 202 depicted in FIGS. 1-2, may execute. The computer-readable medium 400 may be an electronic, magnetic, optical, or other physical storage device that contains or stores executable instructions. The computer-readable medium 400 may be, for example, Random-Access memory (RAM), an Electrically Erasable Programmable Read-Only Memory (EEPROM), a storage device, an optical disc, or the like.

The processor may fetch, decode, and execute the instructions 402 to retrieve a firmware 212 of a hardware component 210 of a computing device at bootup of the computing device. In this regard, the firmware 212 may have been previously updated at the hardware component 210. The processor may fetch, decode, and execute the instructions 404 to initiate authentication of the firmware 212 using a firmware signature 214 stored in a memory 208. In response to a determination that an authentication of the firmware 212 has failed, the processor may fetch, decode, and execute the instructions 406 to recover the firmware 212. In this regard, the processor may determine that a firmware update 218 for the hardware component 210 is stored in the memory 208. In some examples, the processor may replace the firmware 212 with the firmware update 218 at the hardware component 210. The processor may authorize the hardware component 210 to establish connection to a bus 216 based on the firmware update 218.

According to examples, in response to a determination that the firmware update for the hardware component is absent from the memory, the processor may disallow connection of the hardware component 210 to the bus 216, disable the hardware component 210, and/or generate a notification indicating that the authentication of the firmware 212 has failed. In some examples, the processor may determine that the authentication of the firmware 212 has failed in response to a determination that the firmware signature 214 does not match the firmware 212 or in response to a determination that the firmware signature 214 is absent from the memory 208.

For simplicity and illustrative purposes, the present disclosure is described by referring mainly to examples. In the previous description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
 a hardware component;
 a memory; and
 a processor to:
  retrieve a firmware for the hardware component subsequent to the firmware being loaded on the hardware component;
  determine whether a firmware signature associated with the firmware is stored in the memory;
  in response to a determination that the firmware signature associated with the firmware is absent from the memory, initiate a recovery process to recover the firmware on the hardware component, wherein to initiate the recovery process, the processor is to:
   disallow connection of the hardware component to a bus;
   disable the hardware component;
   replace the firmware for the hardware component; and
   generate a notification indicating an authentication status of the firmware of the hardware component; and
  in response to a determination that the firmware signature associated with the firmware is stored in the memory, initiate authentication of the firmware.

2. The apparatus of claim 1, wherein the processor is to determine that the firmware is not authentic in response to the determination that the firmware signature associated with the firmware is not stored in the memory.

3. The apparatus of claim 1, wherein, in response to a determination that the firmware signature associated with the firmware is stored in the memory, the processor is further to retrieve the firmware signature from the memory to a basic input/output system (BIOS) to authenticate the firmware.

4. The apparatus of claim 1, wherein the processor is to:
 determine whether a firmware update associated with the hardware component is stored in the memory; and
 in response to a determination that the firmware is not authentic, initiate a firmware replacement process to replace the firmware with the firmware update.

5. The apparatus of claim 1, wherein the memory is a storage of an embedded controller.

6. The apparatus of claim 5, wherein:
 the memory and the firmware signature are stored in the embedded controller; and
 the processor is to execute a BIOS to allow or disallow connection of the hardware component during bootup of the apparatus in response to the firmware being authenticated using the firmware signature.

7. An apparatus comprising:
 a hardware component;
 a basic input/output system (BIOS);
 an embedded controller having a memory; and
 a processor to execute the BIOS to:
  retrieve a firmware for the hardware component;
  determine whether the firmware is inauthentic in response to a firmware signature associated with the firmware being absent from the memory of the embedded controller; and
  in response to the determination that the firmware is inauthentic, initiate a recovery process to recover the firmware for the hardware component, wherein to initiate the recovery process, the process is to execute the BIOS to:
   disallow connection of the hardware component to a bus;
   disable the hardware component;
   replace the firmware for the hardware component; and
   generate a notification indicating an authentication status of the firmware of the hardware component.

8. The apparatus of claim 7, wherein the processor is to execute the BIOS to further determine that the firmware is inauthentic in response to a verification process to authenticate the firmware using the firmware signature associated with the firmware.

9. The apparatus of claim 7, wherein a firmware update associated with the hardware component is stored in the memory, and
 in response to a determination that the firmware is inauthentic, the processor is to execute the BIOS to recover the firmware on the hardware component by replacing the firmware with the firmware update.

10. A non-transitory computer-readable medium on which is stored computer-readable instructions that when executed cause a processor of a computing device to:
- retrieve a firmware for a hardware component of the computing device at bootup of the computing device, the firmware being previously updated at the hardware component;
- initiate authentication of the firmware using a firmware signature stored in a memory;
- in response to a determination that the authentication of the firmware has failed, initiate a recovery process, wherein to initiate the recovery process the instructions further cause the processor to:
- disallow connection of the hardware component to a bus;
- disable the hardware component
- determine that a firmware update for the hardware component is stored in the memory;
- replace the firmware with the firmware update at the hardware component;
- generate a notification indicating an authentication status of the firmware of the hardware component; and
- authorize the hardware component to establish a connection to the bus based on the firmware update.

11. The non-transitory computer-readable medium of claim 10, wherein the instructions are further to cause the processor to:
- determine that the authentication of the firmware has failed in response to a determination that the firmware signature does not match the firmware or in response to a determination that the firmware signature is absent from the memory.

\* \* \* \* \*